United States Patent
Bayer et al.

(10) Patent No.: US 8,973,346 B2
(45) Date of Patent: Mar. 10, 2015

(54) EXHAUST GAS TREATMENT OF GAS TURBINE ENGINES

(71) Applicant: Airbus Operations GmbH, Hamburg (DE)

(72) Inventors: Erwin Bayer, Dachau (DE); Jürgen Steinwandel, Uhldingen-Mühlhofen (DE); Emmanuel Joubert, Issy les Moulineaux (FR)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/707,990

(22) Filed: Dec. 7, 2012

(65) Prior Publication Data
US 2013/0118180 A1 May 16, 2013

Related U.S. Application Data

(63) Continuation of application No. PCT/EP2011/058898, filed on May 31, 2011.

(30) Foreign Application Priority Data

Jun. 7, 2010 (EP) .................................. 10290302

(51) Int. Cl.
*F02C 3/30* (2006.01)
*F01N 3/08* (2006.01)
*F01D 25/30* (2006.01)

(52) U.S. Cl.
CPC ............. *F01N 3/08* (2013.01); *F01D 25/305* (2013.01); *F05D 2270/082* (2013.01); *Y02T 50/677* (2013.01)
USPC ............................................. 60/39.5; 60/770

(58) Field of Classification Search
USPC ............... 60/39.5, 770, 39.091, 39.17, 39.19, 60/39.59, 805–806, 39.83, 730
See application file for complete search history.

(56) References Cited

U.S. PATENT DOCUMENTS 4,372,770 A * 2/1983 Krumwiede et al. .............. 65/27
5,272,867 A * 12/1993 Emsperger ..................... 60/775
(Continued)

FOREIGN PATENT DOCUMENTS

| CN | 1256358 A | 6/2000 |
| CN | 1294670 A | 5/2001 |

(Continued)

OTHER PUBLICATIONS

Chinese Office Action for Application No. 201180027808.3 dated Jun. 26, 2014.

(Continued)

*Primary Examiner* — Andrew Nguyen
(74) *Attorney, Agent, or Firm* — Lerner, David, Littenberg, Krumholz & Mentlik, LLP (57) ABSTRACT

A gas turbine engine, especially a turbojet or turbofan for an aircraft, includes a combustion section and an exhaust section produces an exhaust gas. The emission products can be reduced by using a gas treatment device with a reactor and an injection device. The reactor produces a nitrogeneous substance such as ammonia. This reducing agent is injected in the gas phase in the exhaust section of the gas turbine engine. By selective non catalytic reaction the Nitrogen oxides of the exhaust gas can be reduced. Furthermore the injection device is arranged such that the temperature window of this reduction process is ranging from 850° C. to 1100° C. The reactor for producing gaseous ammonia can either be a thermal reactor or a high pressure plasma device.

14 Claims, 4 Drawing Sheets

(56) References Cited

U.S. PATENT DOCUMENTS

| | | | |
|---|---|---|---|
| 5,279,108 A * | 1/1994 | Loll | 60/39.5 |
| 5,282,355 A | 2/1994 | Yamaguchi | |
| 6,266,953 B1 | 7/2001 | Ramstetter et al. | |
| 6,343,462 B1 | 2/2002 | Drnevich et al. | |
| 6,619,030 B1 * | 9/2003 | Seda et al. | 60/226.1 |
| 6,701,717 B2 * | 3/2004 | Flatman et al. | 60/792 |
| 6,878,359 B1 * | 4/2005 | Mathes et al. | 423/239.1 |
| 6,928,807 B2 * | 8/2005 | Jacob et al. | 60/286 |
| 7,802,434 B2 | 9/2010 | Varatharajan et al. | |
| 2004/0040288 A1 | 3/2004 | Jacob et al. | |
| 2007/0022744 A1 * | 2/2007 | Hemingway et al. | 60/286 |

FOREIGN PATENT DOCUMENTS

| | | |
|---|---|---|
| CN | 101265842 A | 9/2008 |
| DE | 19808722 A1 | 9/1999 |
| DE | 19810275 A1 | 9/1999 |
| WO | 2008139146 A2 | 11/2008 |

OTHER PUBLICATIONS

Chinese Office Action for Application No. 201180027808.3 dated Jan. 9, 2015.

* cited by examiner

EXHAUST GAS TREATMENT OF GAS TURBINE ENGINES

CROSS-REFERENCE TO RELATED APPLICATIONS

The present application is a continuation of International Application No. PCT/EP2011/058898, filed May 31, 2011, published in English, which claims priority from European Patent Application No. 10290302.8, filed on Jun. 7, 2010, the disclosure of which is hereby incorporated herein by reference.

FIELD OF THE INVENTION

The invention relates to gas turbine engines with an exhaust gas treatment device for reducing nitrogen oxides and a method for reducing nitrogen oxides in the exhaust section of a gas turbine engine. The invention relates to gas turbine engines especially turbojet or turbofan engines which are used for propulsion of larger aircrafts as for example passenger aircrafts or military combat aircrafts.

BACKGROUND OF THE INVENTION

Gas turbine engines typically include turbine stages, which deliver air to a compressor section. The compressed air is delivered downstream to a combustion section. The energy of a gas turbine engine is generated by burning a fuel-air mixture, which is characterized by a high excess of oxygen i.e. lean burning. During the combustion a stream of hot expanding gas forms. The hot expanding gases are directed from the combustion chambers through the blades of a turbine. As the air flows through this area, velocity is increased accompanied by a decrease in air pressure. The rotary power of the turbine can rotate the compressor to replenish air supply. The gases still possessing energy are discharged to the atmosphere through a nozzle that accelerates the gas stream. Thus thrust of the aircraft can be produced by the escaping gas stream.

As air traffic grows, a development is needed to reduce aircraft engine emissions in order to minimize the environmental impact in the troposphere and at high altitudes as in the lower stratosphere, where the main cruising routes are. The Intergovernmental Panel on Climate Change (IPCC 2007) recommends that developed countries need to reduce emissions to 25-40% within the next 10 years, and indicate a sustainability goal for 2050 of about 85% reduction in carbon dioxide (abbreviated hereinafter with $CO_2$) emissions from 1990 levels in order to stabilize atmospheric greenhouse gases. Aircrafts emit $CO_2$ and nitrogen oxides (abbreviated hereinafter with $NO_x$ where x is an integer) and therefore contribute to greenhouse gases. The fact that aircrafts are already included in the emission trading scheme represents an incentive to reduce these emissions. The $CO_2$ emission issue is mainly related to engine efficiency improvement. On the other hand, higher engine efficiency at a constant rate of power leads also to a decrease in $NO_x$ emissions. The role of $NO_x$ is important in the formation of tropospheric ozone and acid rain. Therefore it is essential to exploit technical possibilities for limiting $NO_x$ emissions.

A distinction is made between thermal NO, which is formed from atmospheric nitrogen at high gas temperatures prevailing in the combustion section of a gas turbine, and fuel-NO, which is formed from the nitrogen contained in the fuels at lower temperatures. Under fuel lean conditions and at high temperatures molecular nitrogen ($N_2$) and oxygen ($O_2$) in the combustion air dissociate and produce nitric oxide emissions by a series of reactions wherein the three principal are:

$$N_2 + O \rightarrow NO + N \quad (1)$$

$$N + O_2 \rightarrow NO + O \quad (2)$$

$$N + OH \rightarrow NO + H \quad (3)$$

Besides primary measures for emission reduction, which are combustion related, secondary measures as exhaust gas treatments serve to decompose $NO_x$ already formed. However, in the aviation sector due to the fact that the thrust of the core flow of the engines is essentially required for aircraft propulsion in high altitudes, the use of a secondary denitrification technology as a catalyst located in the exhaust flow is not possible. Therefore there is an demand for secondary measures applicable to the high temperature processes in turbojet engines without disturbing the jet propulsion.

BRIEF SUMMARY OF THE INVENTION

An aspect of the invention provides a device and method for treatment of gas turbine engine exhaust, which can reduce $NO_x$ emissions without disturbing the jet propulsion and taking into account the temperature conditions of the gas turbine engine.

According to an embodiment of the invention a gas turbine engine comprises a combustion section for lean burning resulting in an exhaust gas, an exhaust section for delivering the exhaust gas and an exhaust gas treatment device with an injection device. The exhaust gas treatment device further comprises a reactor for producing a gaseous reducing agent for a reduction of nitrogen oxides of the exhaust gas, wherein the injection device is adapted to inject the gaseous reducing agent into the exhaust section.

In the combustion section the air is mixed with fuel and combusted in the presence of excessive oxygen. The hot exhaust gas containing $NO_x$ is delivered downstream into the exhaust section over turbine rotors. The concentrations of $NO_x$ in the exhaust gas varies according to the type of engine, air/fuel ratio and phase of engine operation. After injection of a gaseous reducing agent into the exhaust section by means of an injection device $NO_x$ can be reduced in the exhaust gas.

Thus the exhaust gas treatment for turbojet engines or turbofan engines focuses on the use of selective non-catalytic reduction (SNCR) which does not disturb the jet propulsion. During the SNCR method the nitrogen oxides are removed by a reaction with a nitrogen containing reducing agent in order to convert $NO_x$ to inert nitrogen gas. Common nitrogen containing compounds are for example ammonia, cyanuric acid, or organic amines. For an efficient SNCR the amine type reducing agents need to be injected into hot airstreams of a temperature range between 800° C. and 1200° C. Because of this temperature limitation the non-catalytic $NO_x$ reduction processes can usually not be applied directly in or after the combustion section, which in dependence of the air/fuel mixing ratio and flame zone position may show temperatures even above 2000° C. Therefore, the non-selective catalytic reduction is rather applicable in the exhaust section with a temperature window below about 1100° C.

The selective $NO_x$ reduction by a homogenous gas reaction is only possible if nitrogen containing molecules are used. The schematic reaction is as follows (where m and n are integer values and X is an atom or molecule):

$$mNO + XnN \rightarrow N_2 + OmXn \quad (4)$$

If gaseous ammonia is used as a nitrogen containing substance, one possible reaction with exceed of oxygen would read:

$$4NO+4NH_3+O_2 \rightarrow 4N_2+6H_2O \quad (5)$$

As already said above, the combustion section cannot be used as injection zone, because the high temperature ranges could lead to a generation of NO from ammonia, and therefore limiting the efficiency of the catalytic process. Therefore, the reducing agent is injected in the exhaust section, where the temperature range is already lower and below the temperature of about 1100° C. and during the SNCR the stable triple bond of the nitrogen molecule $N_2$ can be produced according to the reactions (4) and (5).

By using a reactor a gaseous reducing agent can be produced which can cause neither harm nor erosion on a turbine blade. A gaseous reducing agent can be for example produced by a hydrolysis of urea into the gaseous products ammonia $NH_3$ and carbon dioxide $CO_2$, which gases can be separated and added as a gas mixture into the exhaust section. The reactor can either be a thermal or high pressure plasma device in order to produce this gaseous reducing agent for eventually reducing the nitrogen oxides of the exhaust gas.

Thus an exhaust gas purification system can be provided without any interference with the engine core flow. Furthermore, the $NO_x$ reduction can be realized without any combustion chamber modifications.

According to another embodiment of the invention, the gas turbine engine further comprises a high pressure turbine and a low pressure turbine arranged in serial flow in the exhaust section for receiving the exhaust gas from the combustion section wherein the injection device is adapted to inject the reducing agent into the low pressure turbine.

The serial arrangement of a high pressure turbine and a low pressure turbine is typically used in two shaft turbojet engines. Generally, the turbine sections include rotating components mounted on one or more coaxial shafts for rotation about a central axis of the engine. The turbine rotors may include blades and static airfoils or vanes. Dependent on the turbine stages and the temperature in the sections, the location of the injection of the reducing agent is chosen. If the injection is done downstream the high pressure turbine, the temperatures of the exhaust gas are already as low as necessary for the selective reduction of nitrogen oxides to the inert products nitrogen and water. By injecting only gaseous reducing agents, the blades of the low pressure turbine cannot be damaged or eroded. If the blades are rotating, the movement can be used to homogeneously distribute the reducing agent into the exhaust gas stream.

Typical two shaft arrangements for use on an aircraft combine the first compressor stages into the low pressure compression system with the low pressure turbine. In such a two shaft engine, the inlet for the injection is preferably located between the high pressure turbine and low pressure turbine. In a three shaft engine, the injection device is preferably located between the high pressure turbine and the intermediate pressure turbine. Having at least two different shafts, the materials for the low pressure turbines can be differently chosen in relation to the high pressure turbine. Therefore, the material especially resistant to the reducing agent as e.g. ammonia can be selected.

According to another embodiment of the invention, a gas turbine is provided wherein the process temperatures in the exhaust section for reducing nitrogen oxides are in a range from 800 to 1100° C.

The selective non-catalytic reduction process preferably takes place at high temperatures ranging between 850 and 1050° C. At this temperatures, the injection of a reducing agent containing nitrogen causes NO to be decomposed into the environmentally neutral products $N_2$ (inert nitrogen) and $H_2O$ (water). By locating the injection device in the exhaust section, preferably at the low pressure turbine, the temperature window can be optimally exploited. Thus the process temperature of the SNCR does not fall outside the temperature window and a decrease of the SNCR catalytic conversion efficiency can be prevented.

According to another embodiment of the invention, the injection device of the gas turbine engine is selected from one of the following groups: a high pressure nozzle, a metering lance, a grid with a plurality of nozzles, and a distribution ring. Using this injection technology, the reagents are introduced into the exhaust section over the entire cross section.

The uniform distribution of the reducing agent and reagent gases as ammonia are created by one or a plurality of nozzles which can be arranged in a ring or a grid. Furthermore, the homogeneous distribution can be achieved by using a high pressure nozzle. Furthermore a metering lance can be used which can be moved relative to the rotational axis of the gas turbine engine. A metering lance allows to control the amount of reducing agent which is distributed into the exhaust gas.

According to another embodiment of the invention, the gas turbine further comprises a control unit wherein the control unit controls the injection rate of the reducing agent according to the conditions in the combustion section.

The control of the injection device and injection rate can depend on the rotational speed of the combustion engine as well as the amount of fuel injected in the combustion section. The reducing agent, as for example ammonia, shall be used in an amount which is efficient to reduce the $NO_x$ concentration in the exhaust gas substantially. Furthermore, the temperatures should be controlled in order to guarantee the optimal process temperatures. The control unit and injection devices can also be used to inject an additional reducing agent which can for example lower the process temperature. Thus according to the process temperature in the injection zone, an additional reducing agent can be added. Furthermore, a combination with an air injection nozzle is also possible. If, for example, air is injected in the same turbine stage for cooling the turbines, the reducing agent can use the same injection device thus diluting the reducing agent.

According to another embodiment of the invention, the reactor is a hydrolysis reactor further comprising a separator for separating aqueous urea or a mixture of urea with another nitrogen containing substance from the gaseous products ammonia and carbon dioxide.

The schematic reaction of the hydrolysis is as follows:

$$NH_2CONH_2(urea)+H_2O(water) \rightarrow NH_3(ammonia)+CO_2 \quad (6)$$

The above overall reaction, which releases ammonia and carbon dioxide as gases, requires heat and is promoted if excess of water is present. The products of this reaction are gases and can be separated by a separator from the aqueous solution of urea or a mixture of urea with another nitrogen containing substance. The separated ammonia can be diluted with air as described above by a combination of an air inlet and reducing agent injection nozzle. In this way, a larger gas flow is provided and a more uniform distribution of the ammonia in the exhaust gas flow can be achieved. Thus a good mixing and a near-stoichiometric matching for the conversion of nitrogen oxides by ammonia to water is supported. A typical ratio for a good conversion is a $NH_3$-to-NO-ratio ranging from 0.5 to 2.0.

According to another embodiment of the invention, the reactor is a high pressure plasma device.

A non-thermal high pressure plasma device can be used in order to produce carbon dioxide and ammonia. The plasma device may rely on a discharge method by corona discharge or coaxial reactor and a dielectric barrier discharge. By means of a high pressure plasma, the reducing agent ammonia can be activated in the gaseous phase. The plasma-induced formation of radicals can accelerate the nitrogen reduction in the following gas treatment. The performance of the plasma can be regulated in dependence of the gas mass flow as well as the rotary speed or other parameters of the operation of the gas turbine engine. Using either an AC/DC corona or dielectric barrier discharge, the performance can be controlled by regulating the current amplitude of the discharge.

According to another embodiment of the invention, the reactor is a thermal reactor.

The generation of gaseous ammonia from urea or mixtures containing urea is promoted if heated in a reactor. From this thermal reactor, a gaseous product mixture of ammonia, $CO_2$ and water can be separated and withdrawn.

According to another embodiment of the invention, the reactor further comprises a heat exchanger for maintaining the reactor temperature within a temperature range from 110° C. to 300° C.

By using a heat exchanger the temperature can be controlled to temperatures between about 110° C. to about 300° C. This thermal hydrolysis reactor is typically operated at temperatures of about 125° C. to about 180° C. Thus, the reaction to form the gaseous ammonia containing product can be controlled by regulating the temperatures. The heat input by the heat exchanger is adjusted to maintain the desired operating temperature. The heat exchanger is coupled to the combustion section in order to provide the heat transfer. The heat exchanger can comprise a heat exchanging medium therein. Furthermore, the heat transfer can either be achieved by using a gas/gas heat exchanger, gas/liquid heat exchangers or heat pipes.

According to another embodiment of the invention, the gas turbine engine is an aircraft turbo engine with an outer casing comprising the gas treatment device.

Typical aircraft turbo engines are turbojet engines, turbofan engines or turbo shaft engines. The reaction engines, which use the thrust of an exhaust accelerating out of the back of the engine, are especially suited for a non-catalytic gas treatment device. Without an installation of an catalytic device no pressure drop is induced and the thrust of the turbo engine of the aircraft can be maintained.

According to another embodiment of the invention, the gas turbine engine further comprises at least one turbine air cooling device for injecting cooling air in the exhaust section wherein the injection device is adapted to direct the reducing agent into the end part of the turbine air cooling device.

By injecting the reducing agent into the end part of the turbine air cooling device, the reducing agent ammonia can be diluted or mixed with the air used for cooling. Thus, a better distribution of the reducing agent can be achieved and simultaneously, the injection device for the air cooling of turbine blades can be used.

According to another embodiment of the invention, a method is provided for removing nitrogen oxides from an exhaust gas of a gas turbine engine by an exhaust gas treatment device, the method comprising: Hydrolysis of an aqueous solution of a nitrogen containing substance into a gaseous reducing agent in a hydrolysis reactor of the exhaust gas treatment device; separating the gaseous reducing agent from the liquid phase injecting the gaseous reducing agent into the exhaust section by an injection device; and reducing nitrogen oxides of the exhaust gas by reduction with the reducing agent.

Thus, the nitrogen oxides removal is done by the process of selective non-catalytic reduction (SNCR) with, for example, ammonia as reducing agent. By means of the injection device, a continuous stream of gaseous ammonia, carbon dioxide, and water produced by the hydrolysis can be discharged in gaseous form in order to prevent any erosion or affect on the turbine blades. With this process, also the thrust of a gas turbine engine is not affected at all which is essential for use of this gas treatment technology in aviation.

According to another embodiment of the invention, a method is provided with the following steps: mixing of water and urea in a container and heating the hydrolysis reactor to a temperature range from 110° C. to 200° C.

By using urea, risks associated with the transport storage and transfer of ammonia can be excluded. Whereas ammonia is classified as a hazardous material, urea is a stable and non-volatile material which can safely be transported, stored, and handled without risks. Therefore, this is a preferable solution for providing ammonia as a reducing agent on board of aircrafts, wherein the security standards are very high.

The heating of the hydrolysis reactor promotes the hydrolysis, because this reaction is an endothermic one. By regulating the heating which can be done by a heat exchanger coupled to the combustion section of the gas turbine engine, the hydrolysis can be stopped or started.

According to another embodiment of the invention, an aircraft is provided, comprising a gas turbine engine with a gas exhaust treatment device for reducing nitrogen oxides.

It should be noted that the above features may also be combined. The combination of the above features may also lead to synergetic effects, even if not explicitly described in detail. In addition, it should be pointed out that the formulation "comprising" does not exclude other elements and the wording "a" or "an" does not exclude a plurality of elements.

In the following, for further illustration and to provide a better understanding of the present invention, exemplary embodiments are described in more detail with reference to the enclosed drawings.

The illustrations and the figures are diagrammatic and not to scale.

DETAILED DESCRIPTION

Figure 1:
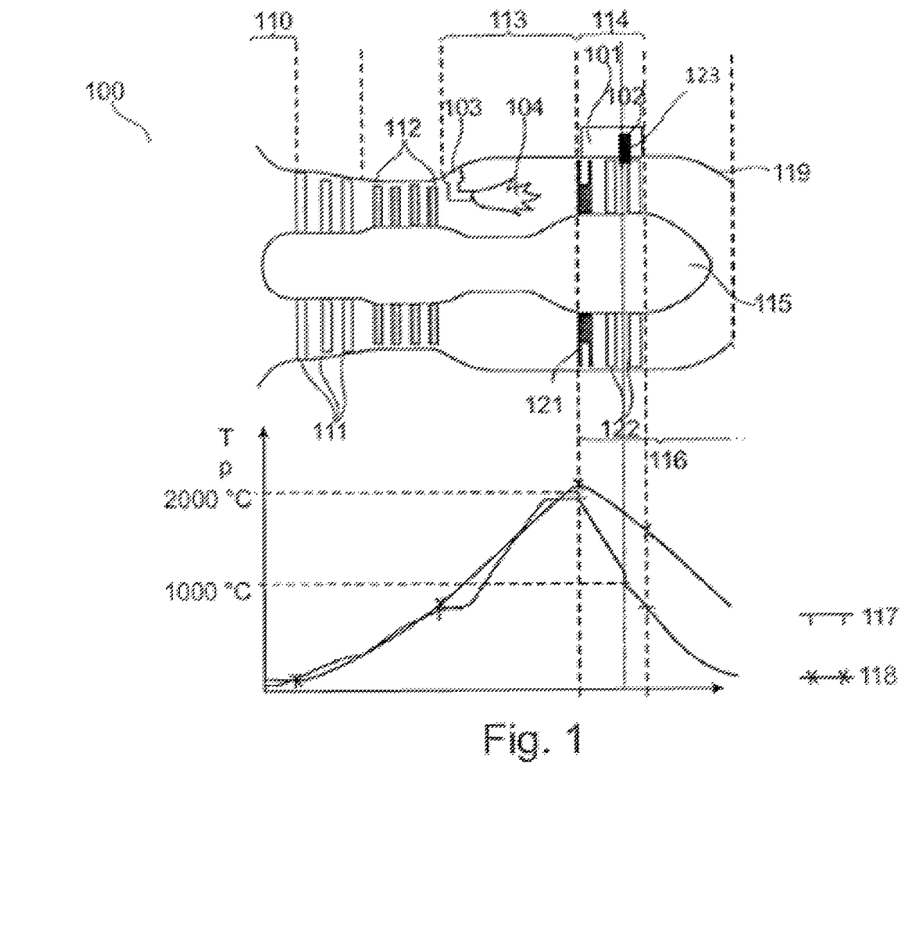
FIG. 1 is a schematic illustration of a gas turbine engine using a gas treatment device in accordance with an exemplary embodiment of the invention.

FIG. 1 is a schematic view of an embodiment of the present invention for an aircraft powered by a turbojet gas turbine engine. In addition, a function of temperature and pressure is shown in dependence of the location of the gases in the casing of the gas turbine engine. This gas turbine engine is only exemplary and is applicable to aircrafts or other vehicles which are powered by turbofan or turbo shaft engines. The turbo gas engine 100 includes in serial flow arrangement an intake section 110, a compressor section 111 and 112, a combustion section 113, and an exhaust section 116. The compressor section includes a low pressure compressor 111 and a high pressure compressor 112. These compressor stages raise the pressure of the inlet air to a relatively high level. This can be seen in the diagram below by the second "X" of the line 118.

The compressed air enters in serial flow arrangement the combustion section 113. The combustion section comprises an injection device 103 for fuel which can be a simple nozzle or a ring of fuel nozzles (not shown). The injected fuel mixes with the air and is ignited by an ignition device (not shown) to a fuel flame 104. The ignition extends the volume of air and further raises the temperature of the gas wherein the burning temperatures of the fuel may reach maximum temperatures of about 2000° C. The temperature of the combustion exhaust gas is maximum downstream the zone of combustion and is usually significantly above 1000° C. at the dashed line separating the zones 113 and 116 as shown in the lower figure by the third "T".

Downstream the combustion section begins the exhaust section 116. Along the flow path, the temperature of the exhaust gas decreases, which is illustrated by the decreasing temperature graph 117 in the lower figure. A temperature range of about 1000° C. may be reached at the location of a injection device 102 (see dotted line). Because the injected air volume has lower temperatures as the surroundings a temperature drop can be seen parallel to the dotted line. The exhaust gas further cools down when following the path from the low pressure turbine (see forth X of pressure graph 117) until it is delivered out of the gas turbine to the atmosphere.

The compressor of this gas turbine engine 100 has two stages in the turbine section, which are the high pressure turbine 122, which is connected to the high pressure compressor 112, and the low pressure turbine 121, which is connected to the low pressure compressor 111. An end part of the gas turbine engine is the exhaust nozzle 115 by which in combination with the shape of the casing 119 the thrust is produced for an aircraft. The hot airflow of the exhaust gas from the combustion section is accelerated when exiting the nozzle thus creating thrust in conjunction with the pressures acting inside the engine that are maintained and increased by the constriction of the nozzle. The decrease of the pressure when passing the exhaust nozzle can be seen in the below figure at the graph line 118.

In the turbine section 114, as well as in the exhaust section 116, there is a gas treatment device 101 shown comprising the injection device 102. This injection device 102 is located where the gas exiting the high pressure turbine enters the low pressure turbine with temperatures about 1000° C. The turbine stages may for example consist of stationary nozzle vanes and rotor blades. The turbines are adapted to convert the hot pressurized gas to useful work and thus drive the compressor through a common shaft.

Because the temperatures of the combustion exhaust gas can be too high for the turbine blades downstream, these blades sometimes have to be cooled to prevent them from melting with a turbine air cooling device 123. One cooling option is to deliver relatively cold air from the compression system to turbine blades and vanes. This cooling can be done with the turbine air cooling device 123 comprising a shower head or tangential injectors. The injection device 102 may be adapted to direct the reducing agent into the end part of the turbine air cooling device 123. These cooling systems can also be used for achieving the process temperature for the selective non-catalytic reduction, which are in the range of 1000° C.

Furthermore the turbine air cooling inlets may also be situated between the low pressure and high pressure turbine sections. Thus, these injection devices can be simultaneously used as injection and inlet for the gas treatment device. The air for cooling would then dilute the reducing agent produced in the reactor of the gas treatment device in order to have a homogenous distribution of reducing agent for reducing the nitrogen oxides in the exhaust gas to the inert gas $N_2$. For good conversion rates, the right temperature ranges have to be obtained. Therefore, a temperature sensor which is not shown can be arranged and used as a control for the injection rate of the reducing agent of the gas treatment device 101.

Figure 2:
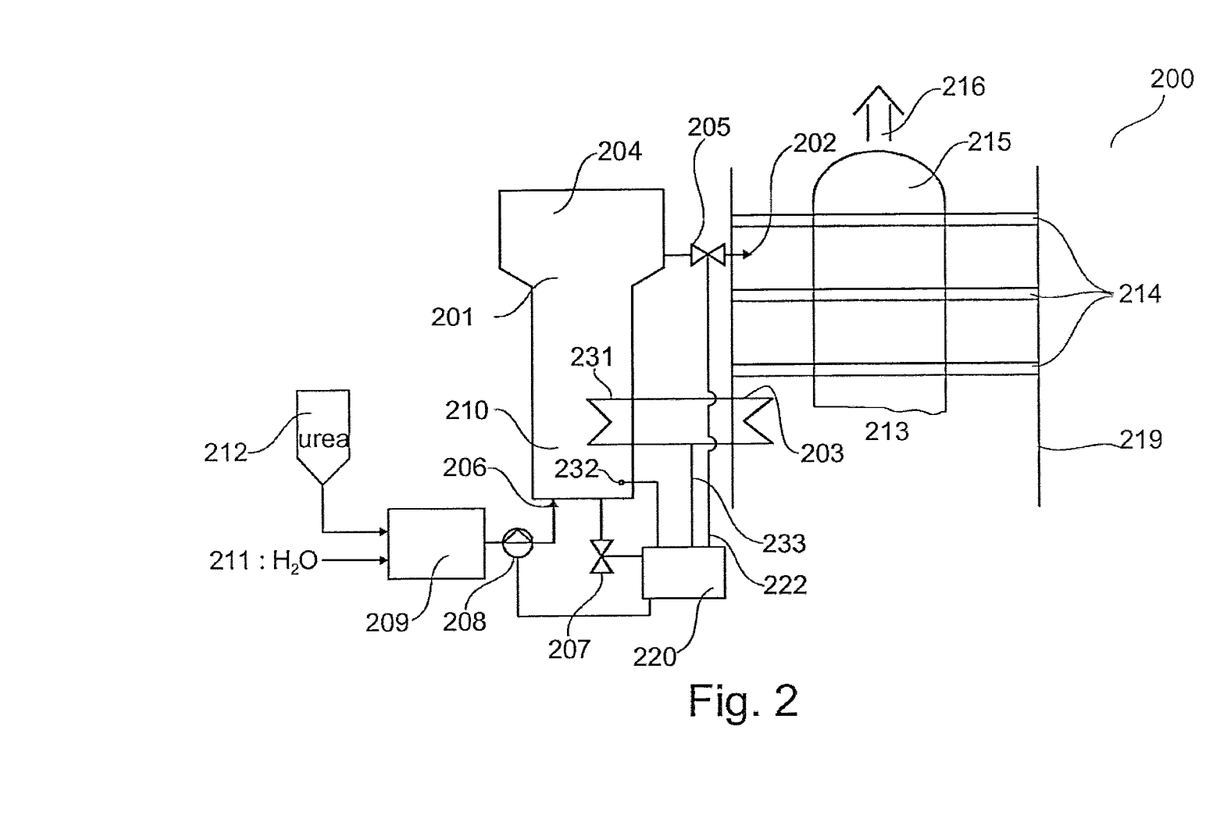
FIG. 2 is a schematic depiction of another exemplary embodiment of the gas turbine engine using a gas treatment device with a thermal hydrolysis reactor.

FIG. 2 shows an exemplary embodiment of a gas treatment device used for a gas turbine engine 200. The sectional view of the gas turbine engine 200 only shows the exhaust nozzle 215 and the turbine section 214. Furthermore, the interface, i.e. the casing 219 is schematically and partly shown where the injection device 202 of the gas treatment device is shown.

The gas treatment device includes a thermal reactor 201 with a lower section 210 in order to receive the aqueous solution of urea, and an upper section 204 in order to separate the gaseous products of the hydrolysis reaction. These gaseous products can be transferred to the injection device by the valves 205. This section should be in a temperature range above 60° C. in order not to allow depositions of solid nitrogen containing substances which form at lower temperatures.

In this figure, urea 212 is contained in a container for storing this material under dry conditions. After mixing it with water by the water supply 211 in the mixing container 209 according to the demand for the injection rate of the reducing agent ammonia, the aqueous solution can be transported by the pump 208 to the inlet 206 into the lower section 210 of the reactor 201. Another reducing agent, which can be used instead of urea, is ammonium carbamate and water as a solvent, which aqueous ammonium carbamate converts to $NH_3$ and $CO_2$ above 60° C.

The hydrolysis reaction of urea, which releases ammonia and carbon dioxide as gases, is promoted if excess of water is present. Thus the control of water supply can additionally control the reaction rate. Urea can be used as an aqueous solution with about 80% concentration or lower. In order to accelerate the reaction of hydrolysis into the products ammonia and $CO_2$ as well as $H_2O$, the thermal reactor 201 is heated by a heat exchanger which transfers the heat of the combustion section 213 by the heat exchanger 203 and a heat transfer medium to the thermal reactor with another heat exchange loop 231 situated in the reactor 201.

For emptying the reactor, there is another valve 207. Furthermore, there can be different sensors for controlling the temperature and a control unit 220 to control the injection rate by the mass flow controller 205 via control line 222. The control unit controls also the feed pump for aqueous urea 208, the water supply 211 and the regulation of the heat exchangers 231 and 203 by a control line 233. Gaseous ammonia is provided by the injection device 202 and a homogenous distribution can be achieved in the turbine section 214 by a high pressure injection and additional rotational dynamics of the turbine blades. Thus a high nitrogen oxide removal can be achieved in the exhaust gas 216 if the gaseous ammonia and carbon dioxide match the stoichiometric conditions of the nitrogen oxides removal.

Furthermore the reducing agent can be diluted with a carrier gas (not shown) which for example is used to cool down the turbine blades. This carrier gas may be air from the environment or bypassed air from the compressor section. Thus the temperature range for optimal reaction of the non-catalytic selective reduction which is in the range of 850 and 1050° C. can be maintained.

The schematic figure only shows schematic view of the thermal reactor. However, the reactor shape can be adapted to the cylindrical shape of the casing of the gas turbine engine. Furthermore there is an outer casing provided which is also in a cylindrical form. This cylindrical form is relevant for aviation in order to maintain as much as possible the aerodynamic shape of a stream body.

Instead of a thermal reactor also a plasma reactor can be provided supporting the formation of radicals. Using $NH_3$ as a reducing agent $NH_x$—radicals facilitate a series of reactions resulting in the removal of $NO_x$.

Furthermore several injection devices may be provided in order to adjust to the combustion conditions. For example an injection device upstream from the first point of injection, which is arranged in the low pressure turbine 122, can be used if the combustion temperatures are lower due to a higher air/fuel mixing ratio. Furthermore the injection rate can be varied by the control unit as well as a dilution rate with a carrier gas. For regulating already in the reactor also the dilution rate of the urea in water can be adapted.

Figure 3:
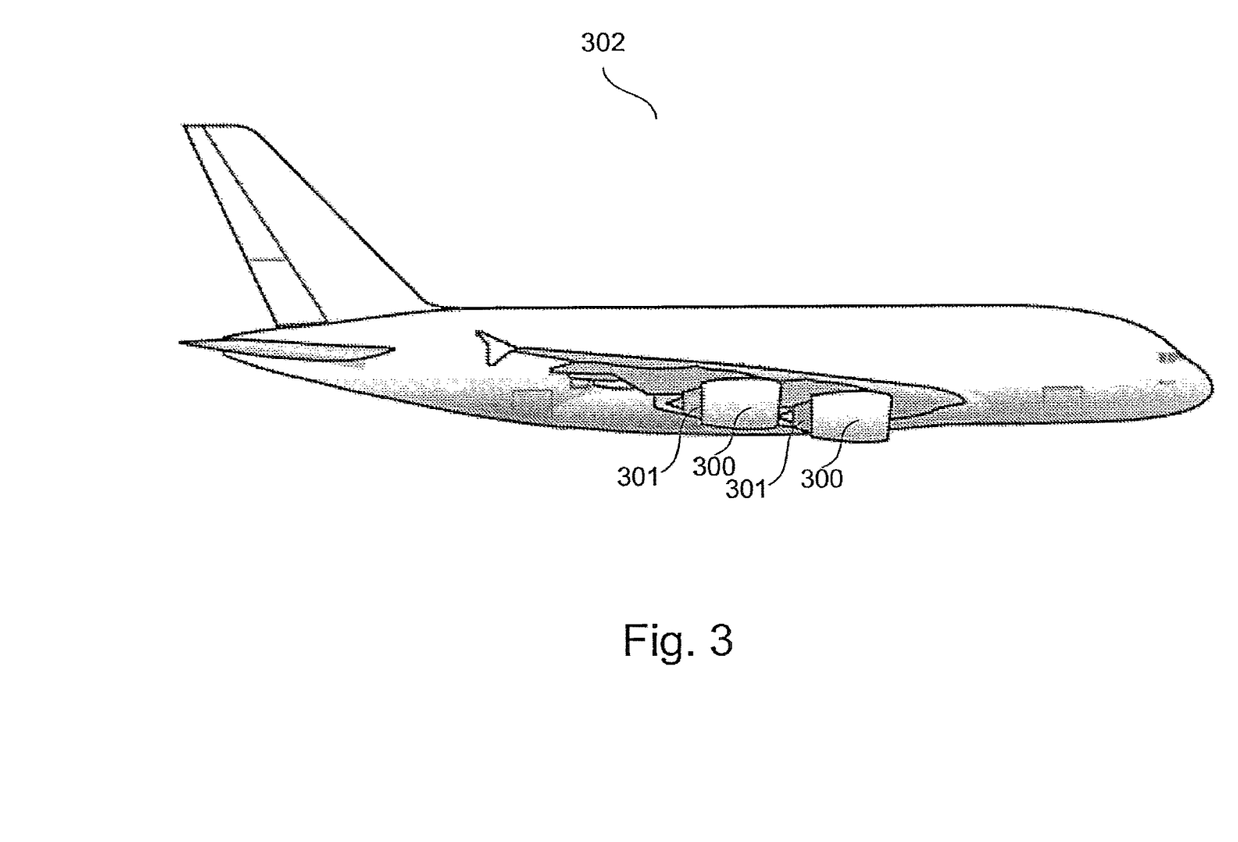
FIG. 3 shows schematically an aircraft with a gas turbine engine and an exhaust treatment device.

FIG. 3 shows an aircraft 302, especially a turbojet aircraft comprising an gas turbine engine 300 with an exhaust gas treatment device 301. FIG. 3 shows only schematically the outer casing of the gas turbine engine being a blunt aerodynamic stream body comprising, a radial, circular air intake. The gas treatment device is arranged between the outer housing and the air duct such that at least room as possible is needed. The equipment needed for the gas treatment device may be combined or coupled with the equipment necessary for operation of the turbojet engine as controller, fuel pumps or electric generator. Especially in order to adjust the injection rate of the reducing agent a central processing unit is able to provide the conditions of the combustion chamber as fuel amount used or temperature and deliver it to the control unit of the gas treatment device.

Injecting a concentration of ammonia into the exhaust gas which is about double as much of the $NO_x$ concentration of the exhaust gas with the temperature range between 850° C. and 1050° C. leads to a reduction efficiency between 50% and 100%. These efficiencies depend on the temperature as well as mixing degree with the exhaust gas.

Figure 4:
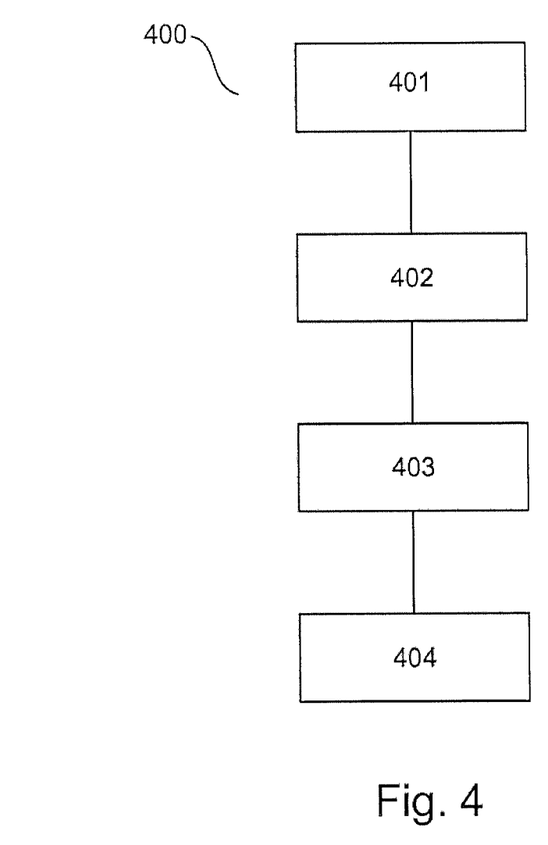
FIG. 4 shows a flowchart of the steps of a method for reducing nitrogen oxides of the exhaust gas of a gas turbine engine according to another exemplary embodiment of the invention.

FIG. 4 shows a flowchart of the steps of a method 400 for removing nitrogen oxides from an exhaust gas of a gas turbine engine by an exhaust gas treatment device. In step 401 the method begins. Step 402 comprises the hydrolysis of an aqueous solution of a nitrogen containing substance into a gaseous reducing agent in a hydrolysis reactor of the exhaust gas treatment device. In the following step 402 the gaseous reducing agent is separated from the liquid phase. After separation step 403 follows, wherein the gaseous reducing agent into the exhaust section by an injection device are injected. Finally nitrogen oxides of the exhaust gas are reduced by reduction with the reducing agent in step 404. Thus substantial reductions in the $NO_x$ concentration of a combustion exhaust gas without disturbing the jet propulsion can be achieved. Furthermore the optimal temperature window can be provided by a suited arrangement of the injection device of the reducing agents.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

REFERENCE NUMBERS 100 gas turbine engine
101 gas treatment device
102 injection device for reducing agent
103 injection device for fuel
104 fuel flame
110 intake section
111 low pressure compressor
112 high pressure compressor
113 combustion section
114 turbine section
115 nozzle
116 exhaust section
117 temperature graph
118 pressure graph
119 casing
121 high pressure turbine
122 low pressure turbines
200 gas treatment device
201 reactor
202 injection device
203 heat exchanger
204 separator
205 mass flow controller
206 reactor inlet valve
207 reactor outlet valve
208 feed pump for aqueous urea
209 container
210 lower section of reactor
212 urea storage container
211 water supply
215 exhaust nozzle
216 exhaust gas
220 control unit
222 control line for mass flow controller
231 reactor heater
232 temperature sensor
233 control line heat exchanger
302 aircraft
300 gas turbine engine
301 gas treatment device
400 method for reducing NOx of an gas turbine engine
401-404 steps of the method

The invention claimed is:
1. An aircraft jet engine comprising:
an outer casing having a first end and a second end;
an intake section defined at the first end of the casing;
a low pressure compressor;
a high pressure compressor;
a combustion section for lean burning;
a high pressure turbine connected to the high pressure compressor;
a low pressure turbine connected to the low pressure compressor;
an exhaust section for delivering exhaust gas; and an exhaust gas treatment device comprising an injection device;

wherein the exhaust gas treatment device further comprises a reactor for producing a gaseous reducing agent for a reduction of nitrogen oxides of the exhaust gas from the combustion section;

wherein the intake section, the low pressure compressor, the high pressure compressor, the combustion section, and the exhaust section are arranged in a serial flow arrangement inside the casing;

wherein the injection device is adapted to inject the reducing agent into the low pressure turbine;

wherein the reactor shape is adapted to the shape of the outer casing.

2. The jet engine according to claim 1, wherein the process temperatures in the exhaust section for reducing nitrogen oxides are configured to be in a range from 800° C. to 1100° C.

3. The jet engine according to claim 1, wherein the injection device is selected out of a group consisting of:
a high pressure nozzle;
a metering lance;
a distribution ring; and
a grid with a plurality of nozzles.

4. The jet engine according to claim 1, further comprising a control unit, wherein the control unit is configured to control the injection rate of the reducing agent according to the conditions in the combustion section.

5. The jet engine according to claim 1, wherein the reactor comprises a hydrolysis reactor comprising:
a separator for separating aqueous urea or a mixture of urea with another nitrogen-containing substance from the gaseous products ammonia and carbon dioxide.

6. The jet engine according to claim 1, wherein the reactor comprises a high pressure plasma device.

7. The jet engine according to claim 1, wherein the reactor comprises a thermal reactor.

8. The jet engine according to claim 7, wherein the thermal reactor comprises a heat exchanger connected to the combustion section for maintaining the reactor temperature within a temperature range from 110° C. to 300° C.

9. The jet engine according to claim 1, further comprising at least one turbine air cooling device for injecting cooling air in the exhaust section;
wherein the injection device is adapted to direct the reducing agent into the end part of the turbine air cooling device.

10. A method for removing nitrogen oxides from an exhaust gas of an aircraft jet engine by an exhaust gas treatment device, the method comprising:
compressing air entering an intake section of the jet engine in a low pressure compressor and a high pressure compressor;
providing compressed air to a combustion section of the jet engine;
receiving exhaust gas from the combustion section in a high pressure turbine and a low pressure turbine arranged in serial flow in an exhaust section of the aircraft jet engine;
hydrolyzing an aqueous solution of a nitrogen containing substance into a gaseous reducing agent in a hydrolysis reactor of the exhaust gas treatment device;
separating the gaseous reducing agent from the liquid phase;
injecting the gaseous reducing agent into the low pressure turbine by an injection device; and
reducing nitrogen oxides of the exhaust gas by reduction with the reducing agent;
wherein the aircraft jet engine is an aircraft turbo engine with an outer casing comprising the gas treatment device, wherein the reactor shape is adapted to the shape of the outer casing.

11. The method of claim 10 further comprising:
mixing water and urea in a container; and
heating the hydrolysis reactor to a temperature range from 110° C. to 200 C.

12. An aircraft comprising a jet engine with a gas exhaust treatment device for reducing nitrogen oxides,
wherein the jet engine comprises:
an outer casing having a first end and a second end;
an intake section defined at the first end of the casing;
a low pressure compressor;
a high pressure compressor;
a combustion section for lean burning;
a high pressure turbine connected to the high pressure compressor;
a low pressure turbine connected to the low pressure compressor;
an exhaust section for delivering exhaust gas;
an exhaust gas treatment device comprising an injection device; and
wherein the exhaust gas treatment device further comprises a reactor for producing a gaseous reducing agent for a reduction of nitrogen oxides of the exhaust gas from the combustion section;
wherein the intake section, the low pressure compressor, the high pressure compressor, the combustion section, and the exhaust section are arranged in a serial flow arrangement inside the casing; wherein the injection device is adapted to inject the reducing agent into the low pressure turbine;
wherein the reactor shape is adapted to the shape of the outer casing; and
an exhaust nozzle defined at the second end of the casing for producing a thrust.

13. The aircraft jet engine of claim 1, further comprising an exhaust nozzle defined at the second end of the casing for producing thrust.

14. The method of claim 10, further comprising producing a thrust by expelling exhaust gas around an exhaust nozzle.

* * * * *